(12) United States Patent
Muyldermans et al.

(10) Patent No.: US 11,739,208 B2
(45) Date of Patent: Aug. 29, 2023

(54) BLOCK COPOLYMERS AND USES THEREOF

(71) Applicant: Kraton Polymers LLC, Houston, TX (US)

(72) Inventors: Xavier D. D. J. Muyldermans, Mont-Saint-Guibert (BE); Aparajita Bhattacharya, Houston, TX (US); Huixian Yang, Houston, TX (US); Koen van Duin, Amsterdam (NL)

(73) Assignee: KRATON CORPORATION, Houston, TX (US)

( * ) Notice: Subject to any disclaimer, the term of this patent is extended or adjusted under 35 U.S.C. 154(b) by 201 days.

(21) Appl. No.: 17/444,969

(22) Filed: Aug. 12, 2021

(65) Prior Publication Data

US 2022/0049083 A1 Feb. 17, 2022

Related U.S. Application Data

(60) Provisional application No. 63/065,893, filed on Aug. 14, 2020.

(51) Int. Cl.
*C08L 53/02* (2006.01)
*C08F 297/04* (2006.01)

(52) U.S. Cl.
CPC ........ *C08L 53/025* (2013.01); *C08F 297/044* (2013.01); *C08F 297/046* (2013.01); *C08F 2810/00* (2013.01); *C08L 2201/02* (2013.01)

(58) Field of Classification Search
CPC .................................................. C08F 212/12
See application file for complete search history.

(56) References Cited

U.S. PATENT DOCUMENTS

| | | | |
|---|---|---|---|
| 5,654,379 | A | 8/1997 | Powers et al. |
| 7,169,848 | B2 | 1/2007 | Bening et al. |
| 2013/0299731 | A1 | 11/2013 | Wright et al. |
| 2022/0396654 | A1* | 12/2022 | Moctezuma Espiricueto ............. C08L 95/00 |

FOREIGN PATENT DOCUMENTS

| | | |
|---|---|---|
| EP | 1923425 B1 | 8/2014 |
| EP | 3666807 A1 | 6/2020 |

* cited by examiner

*Primary Examiner* — Jeffrey C Mullis

(57) ABSTRACT

A hydrogenated block copolymer is disclosed comprising a polymer block A and a polymer block B. Prior to hydrogenation, the polymer block A has a first vinyl aromatic compound, and the polymer block B contains monomers a) a styrene compound having a radical reactive group and b) at least one conjugated diene, and optionally (c) a second vinyl aromatic compound that is same or different from the first vinyl aromatic compound. The repeat units of monomer a) forms 10-80 wt. % of the total block copolymer, and 10-70 wt. % of the total weight of block B. After hydrogenation, the polymerized units derived from the monomer b) has a RU of 0-1.5 meq per gram of the hydrogenated block copolymer. The hydrogenated block copolymer exhibits reactivity and higher flow properties before curing, after curing, shows excellent mechanical properties, improved flame resistance, and good solvent resistance.

20 Claims, 1 Drawing Sheet

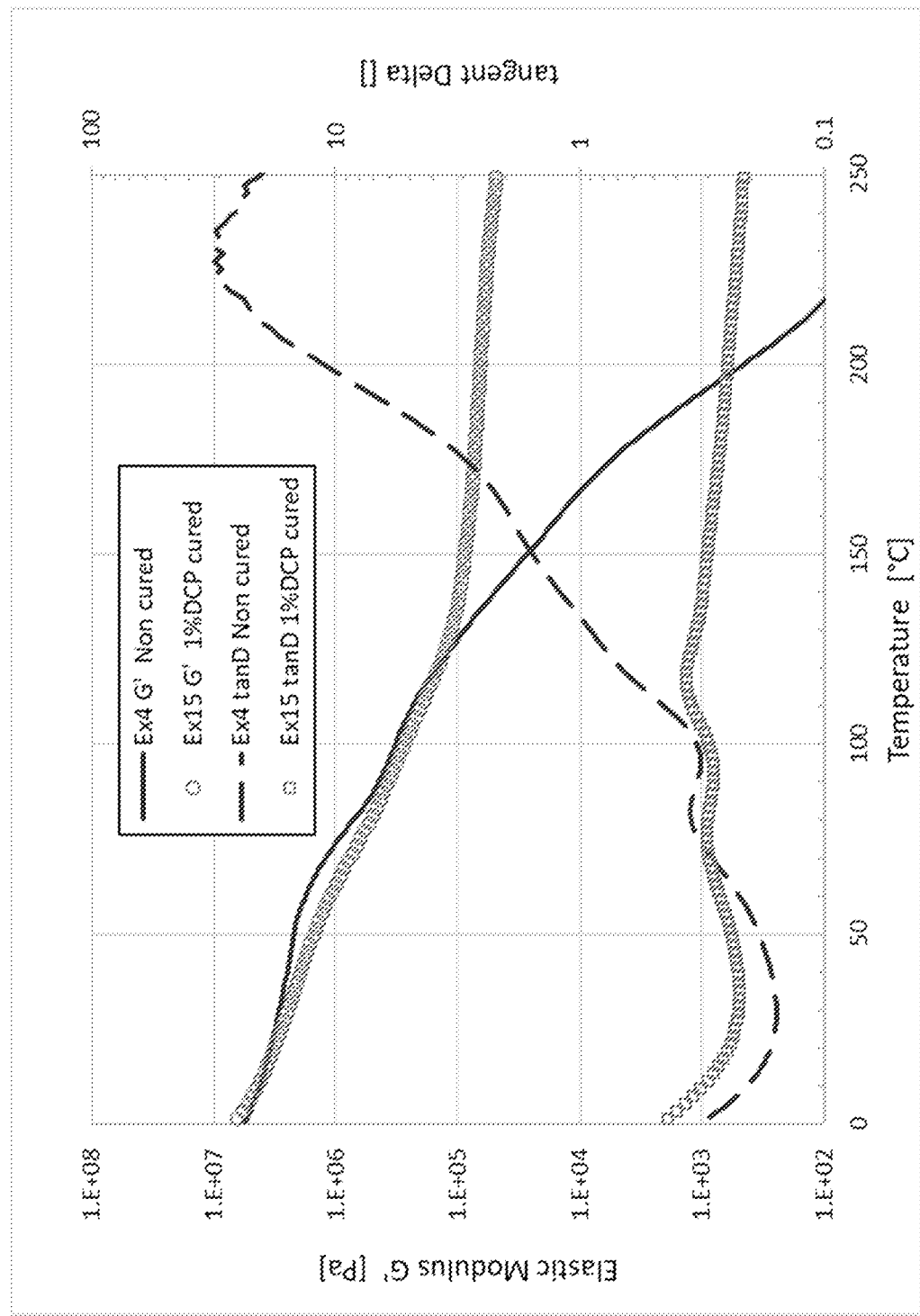

BLOCK COPOLYMERS AND USES THEREOF

RELATED APPLICATIONS

This application claims benefit to U.S. provisional application No. 63/065,893, filed on Aug. 14, 2020, which is hereby incorporated herein by reference.

FIELD

The present disclosure relates to novel reactive block copolymers and their uses.

BACKGROUND

There are a number of applications such as adhesives, sealants, coatings, tires, automotive industry, construction industry, electrical and electronic industry, and medical equipment requiring elastomeric materials with good mechanical performance, low viscosity during processing and reactivity. Additionally, it is desirable for the materials to have excellent solvent resistance as well as high temperature resistance properties. Under certain operating conditions, some applications require materials with high flow and good strength during production, in addition to flame resistance in the final application. Good mechanical performance in terms of strength and impact resistance and weather resistance or ozone resistance are also desirable. Existing thermoplastic materials may not be able to meet such requirements.

There is a continuing need for polymeric compositions exhibiting reactivity and higher flow properties, in addition to excellent mechanical performances after exposure to curing, and improved flame resistance, excellent solvent resistance and mechanical performance at high temperatures.

SUMMARY

In one aspect, the disclosure relates to a hydrogenated block copolymer comprising, consisting essentially of, or consists of at least one polymer block A and at least one polymer block B. Prior to hydrogenation, each block A is a polymer of a first vinyl aromatic compound, and each block B is a copolymer block of monomers (a) a styrene compound having a radical reactive group, (b) at least one conjugated diene, and optionally (c) a second vinyl aromatic compound that is same or different from the first vinyl aromatic compound. The block A has a peak molecular weight (Mp) of 3 to 60 kg/mol, and the block B has a peak molecular weight (Mp) of 20 to 200 kg/mol. The polymerized units derived from (a) constitutes from 10 to 80 wt. % of the total weight of the hydrogenated block copolymer, and from 10 to 70 wt. % of the total weight of the block B. The polymerized units derived from the monomer (b) has a residual olefinic unsaturation of 0-1.5 meq per gram of the hydrogenated block copolymer. The hydrogenated block copolymer has i) a DMA 10 rad/s tangent delta peak maximum temperature of −30 to 80° C., ii) a gel content, after curing, as measured by a Peroxide Cured Gel Test (PCGT), of >40 wt. % of the total weight of the hydrogenated block copolymer, and iii) an aromatic blockiness index of 20 to 80%

In a second aspect, the monomer (a) is para-methylstyrene and the monomer (b) is selected from the group consisting of isoprene, butadiene and combinations thereof. The block B has a corrected 1,4-diene unit content of 10 to 55% and the hydrogenated block copolymer has one or more of: i) a dielectric permittivity (Dk) at 1 GHz of <2.6, ii) a dielectric permittivity (Dk) at 10 GHz of <2.6, iii) a loss tangent (Df) at 1 GHz of <0.002, iv) a loss tangent (Df) at 10 GHz of <0.002, and v) a solution viscosity at 25 wt. % in toluene at 25° C. of <2000 cP.

In a third aspect, the weight percentage of (a) para-methylstyrene in the B block is between 10 and 50 wt. %

In a fourth aspect, the block A comprises polymerized para-methylstyrene units.

DESCRIPTION OF THE FIGURE

The FIGURE is a graph illustrating a Dynamic Mechanical Analysis (DMA) performance including the elastic modulus (G') and the tangent delta (tan delta).

DESCRIPTION

The following terms used in the specification will have the following meanings:

"Aromatic blockiness" or "aromatic blockiness index" refers to the percentage of aromatic groups having two adjacent aromatic units in the block copolymer. The aromatic blockiness index is calculated based on the 1D H-1 NMR spectrum of the block copolymer and is given by the formula: Aromatic Blockiness Index=100*Integral2/Integral1; wherein Integral1 is determined by integrating the H-1 NMR spectrum from 7.5 ppm to 6.0 ppm and dividing the resulting value by 'N', where 'N' is the average number of protons directly connected to the aromatic rings, e.g., 5 for an unsubstituted aromatic group (phenyl ring), 4 for a monosubstituted aromatic group, such as, a para-methylstyryl group, and 3 for a disubstituted aromatic group, such as, a dimethylstyryl group. Integral2 is determined by integrating the H-1 NMR spectrum from the signal minimum, between 6.9 ppm and 6.6 ppm, to 6.0 ppm and dividing by 2. In practice, Integral2 is determined by integrating the area of the spectrum from the signal minimum covering the steepest valley region between a downfield chemical shift of 6.9-6.6 ppm and an upfield chemical shift of 6.0 ppm. Peak areas arising from the solvent protons is not included when calculating the peak areas for Integral1 and Integral2.

"Molecular weight" refers to the styrene equivalent molecular weight in kg/mol of a polymer or a block copolymer. Molecular weights can be measured with gel permeation chromatography (GPC) using polystyrene calibration standards, such as is done according to ASTM 5296. The chromatograph is calibrated using commercially available polystyrene molecular weight standards. The molecular weight of polymers measured using GPC so calibrated are styrene equivalent molecular weights. The detector can be a combination of ultraviolet and refractive index detector. The molecular weights expressed herein are measured at the peak of the GPC trace and are commonly referred to as "peak molecular weights", designated as Mp.

"pMeS" refers to para-methylstyrene, and "St" refers to styrene.

"Radical-reactive group" refers to a chemical group that can form, or can be induced to form a free radical species. Free radical species can be formed by any known means, including thermal means, photochemical means, or chemical reagents. For example, a benzylic carbon having at least one hydrogen substituent can be a radical-reactive group. The benzylic carbon group can also be substituted so long as it has one benzylic hydrogen atom. Another example of a radical-reactive group is a cyclobutane ring, which for example, can be photochemically activated to form free radical species. Other examples of radical-reactive groups include an allyl group, which can form allyl free radical.

"Corrected 1,4-diene unit content" or "C14DUC" refers to a polymer block having repeat units derived from butadiene (Bd), isoprene (Ip) or combinations thereof, is mathematically given in terms of the parameters: wt. % Bd content (Bw) in the total dienes in the polymer block, wt. % of 1,4-addition units of Bd (B14) in the Bd units in the polymer block, wt. % Ip content (Iw) in the total dienes in the polymer block, and wt. % of 1,4-addition units of Ip (I14) in the Ip units in the polymer block, by equation (1):

$$C14DUC=(Bw*B14/100)+Iw*(I14-40)/100 \quad (1)$$

Polymerization of a conjugated diene gives rise to polymerized units that are based on addition across both double bonds (giving rise to 1,4-addition units) as well as one double bond (giving rise to side vinyl groups).

"Residual olefinic unsaturation" or RU refers to an amount in milliequivalents per gram (meq/g) of olefinic C=C groups in the polymerized diene units that have not been reduced after the block copolymer is hydrogenated to the HSBC. RU is measured from ozone titration or the 1H NMR spectrum of the HSBC.

"Peroxide Cured Gel Test" or "PCGT" refers to a test that measures the gel content of a cured composition based on the hydrogenated block copolymer (HSBC) and is expressed in weight percent. PCGT is measured by mixing the HSBC with 0.5 wt. % of BIPB (bis-(t-butylperoxy isopropyl) benzene) initiator and curing at 180° C. for 30 minutes using a Moving Die Rheometer (MDR). Gel calculations are computed by first measuring the cured sample initial weight (Wi) before the sample is immersed in toluene for 1 day. The solution containing the sample is then filtered and the weight of filtered swollen gel (Ws) is recorded. The swollen gel is then dried under vacuum at 60° C. until constant weight is reached, or dried weight (Wd). The gel content (gel %) is calculated using the formula: gel %=100*Wd/Wi. The swell ratio is calculated using the formula: Swelling ratio=Ws/Wd.

"Coupling efficiency" or CE refers to the ratio (expressed in %) of the sum of the integrated peak areas for the coupled species having more than one arm (i.e., n>1) to the sum of the integrated peak areas of the coupled and uncoupled arms (with n=1 and n>1). CE is determined by GPC from the peak surface integration.

"Degree of Branching" or DOB refers to the average number of arms in the coupled species. The DOB is calculated from the GPC peak areas for the individual coupled species with 2 arms, 3 arms, 4 arms, . . . , i arms. The DOB value is calculated using the mathematical expression: DOB=[2*GPC area of 2-arm species+3*GPC area of 3-arm species+4*GPC area of 4-arm species+ . . . i*GPC area of i-arm species]/[GPC area of all coupled species].

The present disclosure in embodiments is directed to a hydrogenated block copolymer here as hydrogenated styrenic block copolymer (HSBC) containing a pMeS in the midblock and compositions containing the HSBC thereof. The HSBC-based composition, before being cured, have high flow and after curing, the cured composition has excellent weatherability as compared to the uncured composition.

Hydrogenated Styrenic Block Copolymer (HSBC): The HSBC is a hydrogenated form of a styrenic block copolymer (SBC), where the SBC, prior to hydrogenation, has at least one polymer block A and at least one polymer block B. In the SBC, i.e., prior to hydrogenation, each A block is a rigid block of a first vinyl aromatic compound, and each B block is a copolymer block of monomers comprises (a) a styrene compound having a radical reactive group, (b) at least one conjugated diene, and optionally (c) a second vinyl aromatic compound that is same or different from the first vinyl aromatic compound.

In embodiments, the first vinyl aromatic compound used for building the polymer block A can be any aromatic compound having at least one vinyl group attached thereto. Non-limiting classes of compounds suitable for use include styrene and substituted styrenes, vinyl naphthalene and substituted vinyl naphthalenes, vinyl indenes, vinyl anthracenes, 1,1-diphenyl ethylene and mixtures thereof. Some specific examples include vinyl aromatic compounds having 8-20 carbon atoms, such as o-methylstyrene, p-methylstyrene, p-tert-butylstyrene, 2,4-dimethylstyrene, alpha-methylstyrene, vinylnaphthalene, vinyltoluene and vinylxylene, or mixtures thereof.

In embodiments, the styrene compound having a radical-reactive group, i.e., monomer (a), can be a substituted styrene of formula (I), a vinyl benzocyclobutene of formula (II), a vinyl dihydroindene of formula (III), a vinyl tetrahydronaphthalene of formula (IV); or any combination thereof.

TABLE 1

Structures of various (a) monomers.

| Formula | Structure | Definition of Substituents |
|---|---|---|
| I | 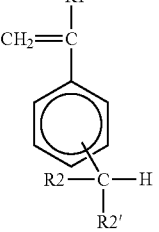 | R1 = H or CH$_3$<br>R2 is H, and R2' is H or a monovalent alkyl group |
| II | 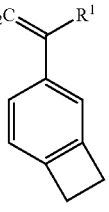 | R1 = H or CH$_3$ |
| III | 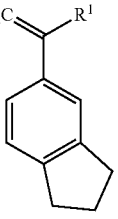 | R1 = H or CH$_3$ |
| IV | 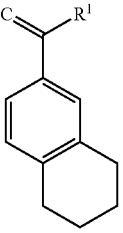 | R1 = H or CH$_3$ |

In embodiments, the monomer (a) of formula (I) is selected from o-methylstyrene, p-methylstyrene, o-ethyl styrene, p-ethyl styrene, o-isopropylstyrene, para-isopropylstyrene, o-methyl-α-methylstyrene, p-methyl-α-methylstyrene, o-ethyl-α-methylstyrene, p-ethyl-α-methylstyrene, o-isopropyl-α-methylstyrene, para-isopropyl-α-methylstyrene and mixtures thereof.

In embodiments, the first vinyl aromatic monomer comprises pMeS, p-methyl-α-methylstyrene, or mixtures thereof.

In embodiments, the copolymer block of monomers in the block (B) containing (b) the conjugated diene monomer is selected from the group consisting of butadiene, isoprene, 2,3-dimethyl-1,3-butadiene, 1-phenyl-1,3-butadiene, 1,3-pentadiene, 1,3-hexadiene, 3-butyl-1,3-octadiene, farnesene, myrcene, piperylene, cyclohexadiene, and mixtures thereof.

In embodiments, the copolymer block of monomers in the block (B) containing optionally (c) the second vinyl aromatic compound, when present, the second vinyl aromatic compound can be any aromatic compound having at least one vinyl group attached thereto. Non-limiting classes of compounds suitable for use include styrene and substituted styrenes, vinyl naphthalene and substituted vinyl naphthalenes, vinyl indenes, vinyl anthracenes, 1,1-diphenyl ethylene and mixtures thereof. Other examples include vinyl aromatic compounds having 8-20 carbon atoms, such as o-methylstyrene, p-methylstyrene, p-tert-butylstyrene, 2,4-dimethylstyrene, alpha-methylstyrene, vinylnaphthalene, vinyltoluene, vinylxylene, and mixtures thereof.

In embodiments, the block A has a peak molecular weight (Mp) of 3-60 kg/mol, or 5-50 kg/mol, or 10-45 kg/mol, or 15-40 kg/mol, or 20-35 kg/mol, or >10 kg/mol or <50 kg/mol.

In embodiments, the block B has a peak molecular weight (Mp) of 20-200 kg/mol, or 30-180 kg/mol, or 40-160 kg/mol, or 50-140 kg/mol, or 60-120 kg/mol, or >20 kg/mol, or <160 kg/mol.

In embodiments, the polymerized units derived from the monomer (a) constitutes from 10-80 wt. %, or 15-75 wt. %, or 20-70 wt. %, or 25-60 wt. %, or 30-65 wt. %, or >15 wt. %, or <75 wt. %, based on the total weight of the polymer block B of the HSBC.

In embodiments, the polymerized units derived from the monomer (a) constitute from 10-70 wt. %, or 15-65 wt. %, or 20-60 wt. %, or 25-55 wt. %, or 30-50 wt. %, or >15 wt. %, or <65 wt. % based on the total weight of the HSBC.

In embodiments, after hydrogenation of the SBC, the obtained HSBC has a RU of 0-1.5 meq, or 0.01-1.4 meq, or 0.02-1.3 meq, 0.05-1.2 meq, or 0.1-1.1 meq, or 0.2-1.0 meq, or 0.025-0.8 meq, or >0 meq, or <1.0 meq, per gram of the HSBC.

In embodiments, the HSBC containing the block B has from 10-50 wt. % of polymerized units derived from pMeS, or 15-45 wt. %, or 20-40 wt. %, or >15 wt. %, or <60 wt. %, based on the total weight of the HSBC.

In embodiments, the HSBC containing the block B has a Corrected 1,4-diene unit content from 10-70 wt. %, or 15-65 wt. %, or 20-60 wt. %, or 25-55 wt. %, or >15 wt. %, or <65 wt. %, based on the total weight of the HSBC. In embodiments, the block B has a corrected 1,4-diene unit content of 10 to 60 wt. %, or 15-55 wt. %, or 20-50 wt. %, or 25-45 wt. %, or >15 wt. %, or <55 wt. %, based on the total weight of the B block.

In embodiments, the HSBC has a structure where the monomer (a) is para-methylstyrene, and the monomer (b) is selected from the group consisting of isoprene, butadiene and combinations thereof.

In embodiments, the HSBC having the at least one block A and at least one block B comprises one or more structures selected from A-B, A-B-A, (A-B)$_n$X, A-B-A-B, (B-A-B)$_n$X, (B-A)$_n$X, and (A-B-A)$_n$X, wherein "X" is a coupling agent (CA) residue, and "n" is 1-30.

In embodiments, the HSBC comprises the block A, the block B, and a block C, wherein the block C contains the conjugated diene monomer selected from butadiene, isoprene, and mixtures thereof. In embodiments, the block C is hydrogenated.

Process of Preparation: The SBC precursor can be prepared by an anionic polymerization using commonly known process in the art. The polymerization initiator is generally an organometallic compound, such as organolithium compounds, for example, ethyl-, propyl-, isopropyl-, n-butyl-, sec-butyl-, tert-butyl-, phenyl-, hexylbiphenyl-, hexamethylenedi-, butadieneyl-, isopreneyl-, 1,1-diphenylhexyl-lithium, or polystyryllithium.

In embodiments, the initiator is used in an amount of 0.002-5 mol %, or 0.005-4.5 mol %, or 0.01-4 mol %, or 0.015-3.8 mol %, or 0.02-3.5 mol %, based on the total mol % of monomers to be polymerized.

In embodiments, a solvent for the anionic polymerization is selected from the group of aliphatic, cycloaliphatic or aromatic hydrocarbons having from 4 to 12 carbon atoms, such as pentane, hexane, heptane, cyclopentane, cyclohexane, methylcyclohexane, decalin, isooctane, benzene, alkylbenzenes, such as toluene, xylene, ethylbenzene, and mixtures thereof.

In embodiments, in the anionic polymerization, polymer chain termination is carried out using a coupling agent, such as bi- or polyfunctional compounds, for example divinylbenzene, halides of aliphatic or araliphatic hydrocarbons, such as 1,2-dibromoethane, bis(chloromethyl)benzene, or silicon tetrachloride, dialkyl- or diarylsilicon dichloride, alkyl- or arylsilicon trichloride, tin tetrachloride, alkyl silicon methoxides, alkyl silicon ethoxides, polyfunctional aldehydes, such as terephthalic dialdehyde, ketones, esters, anhydrides or epoxides. In embodiments, the coupling agent is selected from methyltrimethoxysilane (MTMS), tetramethoxysilane (TMOS), divinylbenzene (DVB), dimethyladipate, and mixtures thereof.

The HSBC is obtained by hydrogenating the SBC precursor using known hydrogenation catalysts, e.g., a catalyst based on nickel, cobalt, titanium, or mixtures thereof.

In embodiments, after hydrogenation, >80 mol %, or >85 mol %, or >88 mol %, or >90 mol %, or >92 mol %, or >95 mol %, or >98 mol %, or >99 mol %, of the in-chain double bonds and the pendant vinyl groups present in the polymerized units derived from (b) the conjugated diene monomer are reduced.

In embodiments, after hydrogenation, <50 wt. %, or <40 wt. %, or <wt. 30%, or <wt. 20%, or <wt. 10%, or <wt. 5% of the arene double bonds are reduced.

Functionalization of HSBC: In embodiments, the HSBC is functionalized by having a substitution to the monomer (a) with a functional group, e.g., a halogen to provide a halogen-functionalized HSBC. This can be achieved by a reaction with a halogen in the presence of light (e.g., a 500 watt tungsten light bulb) or a chemical free radical initiator, such as azobis(isobutyronitrile), as is known in the art, such as for example, U.S. Pat. No. 5,654,379 incorporated herein by reference. The halogenation occurs selectively at the benzylic carbon atom of the radical reactive moiety present in the styrene compound, i.e., in monomer (a). For example, in the case of the HSBC where the monomer (a) is pMeS, bromination can give a bromomethyl-functionalized HSBC. The halogen-functional HSBC can be valuable starting materials for producing a variety of functionalized HSBCs by reaction with nucleophiles. Substitution of other functional groups for the benzylic bromine which is a very active and versatile electrophile, can be accomplished by nucleophilic substitution reactions to introduce the desired functionality.

Curable Composition Based on HSBC: In embodiments, a curable composition is prepared from a mixture comprising 1 to 99.9 wt. % of the HSBC, and 0.1-5 wt. % of a curing initiator, based on the total weight of the curable composition.

The curing initiator can either be a thermal initiator or an actinic initiator. Non-limiting examples of thermal initiators include peroxides, such as di-isobutyl peroxide, di-tert butyl peroxide, dicumyl peroxide, t-butylcumyl peroxide, α,α-bis(tert-butylperoxfy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, diary peroxides, ketone peroxides, peroxydicarbonates, peroxyesters, dialkyl peroxides, hydroperoxides, peroxyketals and mixtures thereof. In embodiments, the peroxide has a 1-hour half-life temperature of >100° C. and <200° C.

In embodiments, the actinic initiator can be selected from unimolecular (type I) and bimolecular (type II) photoinitiators. Examples of type I initiators include benzophenones in combination with tertiary amines, alkylbenzophenones, 4,4'-bis(dimethylamino) benzophenone (Michler's ketone), anthrone, halogenated benzophenones and mixtures thereof. Non-limiting examples of type II initiators include benzoins, benzoin derivatives, especially benzoin ethers, benzil ketals, acylphosphine oxides, especially 2,4,6-trimethylbenzoyl-diphenylphosphine oxide, bisacylphosphine oxides, phenylglyoxylic esters, camphorquinone, alpha-aminoalkylphenones, alpha, alpha-dialkoxyacetophenones, alpha-hydroxyalkylphenones and mixtures thereof.

In embodiments, the curable composition further comprises one or more co-curing agents, a flame retardant, and a solvent which aids in the mixing of components. The solvent is later evaporated to obtain the curable composition for curing.

Examples of useful co-curing agents include one or more members selected from 1,2-bis(vinylphenyl)ethylene, butadiene based liquid rubber, divinyl aromatic compound, triallylcyanurate, triallyisocyanurate, vinyl functionalized polyphenylene oxide such as NORYL® SA-9000, bismaleimide aromatic resin, mono or multifunctional acrylate or methacrylate monomers, plasticizers, tackifying resin, styrenic block copolymers comprising one or more polydiene blocks, and combinations thereof. Suitable examples of co-curing agents include divinylbenzene, 1,2-bis(vinylphenyl)ethane, ethylene glycol methacrylate (EGDMA), trimethylolpropane trimethacrylate (TMPTMA), triallyl isocyanurate, triallyl cyanurate, diethylene glycol diacrylate, neophenylene glycol diacrylate, and mixtures thereof.

In embodiments, the solvent is selected from the group of aliphatic hydrocarbons, aromatic hydrocarbons, or combinations thereof. Suitable examples of the aliphatic hydrocarbon include $C_6$-$C_{12}$ saturated hydrocarbons, such as cyclohexane, methylcyclohexane, n-hexane, heptane, octane, and dodecane. The aromatic hydrocarbon can have 7-10 carbon atoms, such as toluene, xylene, mesitylene, and the like.

In embodiments, the curable composition further includes additives, e.g., other resins, plasticizers, redox couples, fillers, fibers, anti-oxidants, flame retardants, foaming agents, surface treating agents, viscosity modifiers, wetting agents, deaerators, toughening agents, adhesion promoters, dyes, pigments, colorants, heat stabilizers, light stabilizers, lubricants, flow modifiers, drip retardants, anti-blocking agents, antistatic agents, flow-promoting agents, processing aids, substrate adhesion agents, mold release agents, low-profile additives, stress-relief additives, wax, anti-drip agents etc., in amounts of 0.5-50 wt. %, or 1-45 wt. %, or 2-40 wt. %, or 5-30 wt. %, or 8-25 wt. %, or >1 wt. %, or <45 wt. %, based on the total weight of the curable composition.

Exemplary fillers include one or more inorganic silicates such as andalusite, sillimanite, kyanite, mullite, pyrophyllite, or allophane, and mineral calcium silicate, silica, surface treated silica, quartz powder; metal sulfates such as barium sulfate; metal oxides such as zinc oxide, titanium dioxide, zeolites, leucite, potash feldspar, biotite, gypsum, anhydrite or heavy spar, and calcium minerals such as talc or chalk (CaCO3), metal hydroxides. In embodiments, the filler is selected from calcium carbonate, mica, magnesium hydroxide, aluminum hydroxide, and mixtures thereof.

In embodiments, the flame retardant is selected from halogenated compounds, non-halogenated compounds, non-halogenated intumescent compounds, phosphorus-containing compounds, nitrogen-containing compounds, bromine-containing compounds and mixtures thereof.

In embodiments, the plasticizer is any of a paraffinic oil, naphthenic oil, a natural oil, a hydrotreated naphthenic oil, a low molecular weight polyolefin, a low molecular weight styrene-butadiene block, or combinations thereof. In embodiments, the rubber can be selected from natural rubber, synthetic rubber and mixtures thereof. Non-limiting examples include natural rubber, ethylene-propylene-diene-monomer rubber (EPDM), ethylene/alpha-olefin rubbers (EPR), styrene/butadiene rubbers (SBR), acrylonitrile/butadiene rubbers (NBR), polychloroprene rubbers, polybutadiene rubbers (BR), synthetic polyisoprene rubbers (IR), isobutylene-isoprene rubbers (IIR), and the like.

In embodiments, the curable composition include other polymers. Non-limiting examples include polybutadiene, 1,2-polybutadiene, polyisoprene, polybutadiene-polyisoprene copolymers, polybutadiene-polystyrene-polydivinylbenzene terpolymers, poly(phenylene ether) (PPE), curable cyclic olefins or their copolymers, polyacrylates, polydicyclopentadiene, styrene-isoprene-styrene copolymers, butadiene-acrylonitrile copolymers, acrylonitrile-styrene resin, acrylonitrile-butadiene-styrene resin, polyesters, styrenic block copolymer, hydrogenated styrenic block copolymer, polyolefins, polytetrafluoroethylene (PTFE), polyetherimide (PEI), maleimide resin, cyanate ester resin, epoxy resin, phenolic resin, benzoxazine resin, polyamide resin, polyimide resin, polyphenylene sulfide, polyacetal, polysulfone, polyesterimides, polyether sulfone, polyether ketone, fluorine resin, other rubber polymers, and mixtures thereof.

In embodiments, the curable composition contains tackifying resins selected from one or more natural or modified rosins, rosin esters, including those made using polyols, polyterpene resins, phenolic-modified terpene resins, aromatic resin, aliphatic petroleum resins, such as those made using C5 or C9 hydrocarbon streams obtained from petroleum cracking/refining, or any hydrogenated form or combinations of the foregoing.

In embodiments, a curable composition comprising the HSBC, the peroxide initiator, and one or more co-curing agents, can be dynamically cured in the melt phase. This aspect can be valuable for preparing thermoplastic vulcanizates. In the dynamic curing mode, the curable composition is maintained in the melt state. Dynamic curing imposes significant deformation and stresses onto the composition during the curing. The high deformation and stress break up the gel formed during the curing so leading to dispersed micro gels into a thermoplastic phase forming what is usually referred as a thermoplastic vulcanizate.

In embodiments, a curable composition comprises (a) 5-99 wt. % of the HSBC; (b) 0.1-5 wt. % of at least one curing agent; (c) 5-94 wt. % of one or more co-curing agents; and optionally (d) 0.1 to 20 wt. % of additives, based on the total weight of the curable composition.

In embodiments, a curable composition comprises i) 5-95 phr of at least one rubber; ii) 5-50 phr of the HSBC or the functionalized form of the HSBC, iii) 50-200 phr of a filler; iv) 0.1-20 phr of a curing agent, e.g., peroxide; v) up to 70 phr of a plasticizer or a resin; and vi) up to 15 phr of an anti-degradant, where the amounts of components (ii) to (vi) are based on 100 parts of component (i).

In embodiments, the HSBC can also be admixed with a crystalline polyolefin, e.g., crystalline polypropylene, at a ratio of 1:99 to 99:1 HSBC to crystalline polyolefin, to provide blends for varied end uses. In embodiments, the blend further comprise a flame retardant. An example is a blend of 10-50 wt. % HSBC, 1-20 wt. % crystalline polyolefin, and 20-50 wt. % of a flame retardant.

Process of Preparation of Curable Composition Based on HSBC: In embodiments, HSBC and other components can be first mixed with a solvent. The mixture is processed into a desired shape followed by evaporating the solvent. In embodiments, a curable composition containing HSBC is prepared by pre-blending the composition using a suitable device, such as a Henschel mixer, a V-blender, a ribbon blender, and the like. The pre-blended composition can be subsequently extruded into pellets.

Process of Curing Composition Based on HSBC: A thermoplastic vulcanizate (TPV) composition can be made, for example, by a process comprising the steps of introducing molten thermoplastic vulcanizate comprising the HSBC and a free-radical source, where the thermoplastic vulcanizate includes cured rubber dispersed within a thermoplastic matrix having the HSBC. The process can be adapted for continuous production, for example, by (i) dynamically vulcanizing a rubber in a first stage of the process to form a thermoplastic vulcanizate that is in a molten state, (ii) maintaining the thermoplastic vulcanizate in a molten state until a second stage, and (iii) introducing the molten thermoplastic vulcanizate and a free-radical source in the second stage of the process to form the modified thermoplastic vulcanizate.

In embodiments, curing and or crosslinking can be achieved using electron beam, e.g., a series of cathodes that generate a high concentration of electrons, or by irradiating using a halogen element. Electron beam processing can be effected with an electron accelerator, e.g., any of electrostatic direct-current (DC), electrodynamic DC, radiofrequency (RF) linear accelerators (LINACS), magnetic-induction LINACs, and continuous-wave (CW) machines. Crosslinking can be carried out at a suitable temperature, e.g., room temperature, or from ambient to 60° C. The cured compositions can be processed in the melt to form molding compounds, melt films, and hot melt adhesives.

Properties of the HSBC: In embodiments, the HSBC has a solution viscosity at 25 wt. % concentration in toluene at 25° C. of 50-2000 cP, or 70-1800 cP, or 100-1600 cP, or 150-1500 cP, or 200-1200, or 300-1100 cP, or 400-1000 cP, or >100 cP, or <1000 cP, or <2000.

In embodiments, the HSBC has a Dk at 1 GHz of 1-2.6, or 1.2-2.5, or 1.4-2.4, or 1.6-2.2, or <2.6.

In embodiments, the HSBC has a Dk at 10 GHz of 1-2.6, or 1.2-2.5, or 1.4-2.4, or 1.6-2.2, or <2.6.

In embodiments, the HSBC has a Df at 1 GHz of 0-0.002, or 0.0001-0.0022, or 0.0005-0.0024, or 0.0008-0.0026, or 0.001-0.0028, or <0.002.

In embodiments, the HSBC has a Df at 10 GHz of 0-0.002, or 0.0001-0.0022, or 0.0005-0.0024, or 0.0008-0.0026, or 0.001-0.0028, or <0.002.

It is noted that the lower the Dk and Df values, the better the performance in applications such electronics. Further, there is a slight difference for Dk and Df measurements at 1 GHz vs. 10 GHz, but a small difference can be very important depending on the applications.

In embodiments, the HSBC has a dynamic mechanical analyzer (DMA) 10 rad/s tangent delta peak maximum temperature of −30 to 80° C., or −20 to 75° C., or −10 to 60° C., or 0-50° C.

In embodiments, the HSBC has an aromatic blockiness index, measured by 1D 1H-NMR spectroscopy, of 20-80%, or 25-75%, or 30-70%, or 35-65%, or 40-60%, or 40-75%, or >40%, or <70%.

In embodiments, the HSBC has a DMA crossover temperature (T-crossover) of 100-300° C., or 120-280° C., or 140-250° C., or 160-220° C., or 180-200° C., or >110° C., or <220° C.

Properties of Compositions Based on HSBC: Before curing, the composition containing the HSBC has good flow properties. After curing, the cured composition has excellent mechanical performance. Cured compositions have improved flame resistance, excellent solvent resistance, and mechanical performance at high temperatures. Such physical properties makes them valuable for high performance in various applications.

In embodiments, the composition, before curing, has a solution viscosity at 25 wt. % in toluene at 25° C. of 10-1000 cP, or 50-1900 cP, or 100-1800 cP, or 150-1600 cP, or 200-1400 cP, or 250-1200 cP, or >100 cP, or <1000 cP, or <2000 cP.

The properties for cured compositions herein refer to a "Base" composition having 100 parts HSBC, 0.5 parts peroxide (BIPB or DCP) after curing at 180° C. for 2 hours, then compression molded.

In embodiments, the Base composition has a Dk at 1 GHz of 0.2-4, or 0.4-3.8, or 0.6-3.6, or 0.8-3.4, or 1-3.2, 1.2-3, or 1.4-2.8, or 1.6-2.6, <3.5, or <2.6; or a Dk at 10 GHz of 0.2-4, or 0.4-3.8, or 0.6-3.6, or 0.8-3.4, or 1-3.2, 1.2-3, or 1.4-2.8, or 1.6-2.6, <3.5, or <2.6.

In embodiments, the Base composition has a Df at 1 GHz of <0.002, or <0.0025, or <0.003, or <0.0035, or <0.004, or <0.0045, or <0.005; or a Df at 10 GHz of <0.002, or <0.0025, or <0.003, or <0.0035, or <0.004, or <0.0045, or <0.005.

In embodiments, the Base composition has a DMA crossover temperature (Tcrossover) of 200-500° C., or 220-450° C., or 240-430° C., or 250-400° C., or >300° C., or <400° C.

In embodiments, the Base composition further contains at least one flame retardant for a rating of V0, as measured according to UL94 vertical burn test method.

In embodiments, a cured composition (HSBC with 0.5 wt. % of BIPB) has a gel content, based on PCGT, of >40 wt. %, or >45 wt. %, or >50 wt. %, or >55 wt. %, >60 wt. %, >65 wt. %, or >70 wt. %, or >80 wt. %, or >90 wt. %, relative to the total weight of the cured composition, after removing the solvent.

Applications: In embodiments, the composition containing the HSBC can be injection molded or extruded using conventional plastics processing equipment, with or without a curing agent. In embodiments, the HSBC is used for making adhesives, e.g., solvent-based adhesives and melt adhesives; flame retardant articles, hot-melt adhesives, melt blown films, thermoplastic vulcanizates, tires, flexographic plates. Other applications include automotive or transportation, tires, sealants, damping layers in films, buildings, construction, shoes, industrial equipment, healthcare, medical devices, sport equipment, grips, prosthetic components, and bullet-proof equipment.

In embodiments, compositions containing the HSBC are used to make copper clad laminates by combining the required components, e.g., the HSBC, diene-based polymer, cure initiator, flame retardant, and optional additives.

In embodiments, the cured compositions containing HSBC are used for making sealant articles, e.g., a seal for a rotating shaft; a laminate diaphragm sealant article for a diaphragm pump, dynamic seals, static seals, O-rings, co-extruded hose, hose for handling chemicals or fuels, and foamed articles.

In embodiments, thermoplastic vulcanizates (TPV) based on HSBCs can be used for making extruded articles with desirable surface appearance, e.g., weather seals, hoses, belts, gaskets, moldings, boots, elastic fibers, vehicle parts such as weather seals, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, transmission belts including V-belts, toothed belts with truncated ribs, and other elastomeric polymer based parts or elastomeric polymers combined with other materials such as metal/plastic combination materials.

Variety of techniques can be used for making the articles from the composition based on the HSBC, such as foaming (for producing foamed articles), coating, injection molding, extrusion, co-extrusion, blowing, hot melt spraying, laminating with other materials, compression molding, and solution spraying.

EXAMPLES: The following test methods are used.

Polymer molecular weights are determined by gel permeation chromatography (GPC) using polystyrene calibration standards according to ASTM 5296.

Proton NMR methodology is used to determine the total aromatic content ArC, e.g., pMeS content, expressed in weight percent, and the RU expressed in meq of residual olefinic unsaturation per gram of the HSBC.

Brookfield viscosity was measured using ASTM D-2196 test method at 25° C. and is expressed in centipoise (cP) or in milliPascal second (mPa.$).

The viscoelastic behavior of the polymeric samples are measured by Dynamic Mechanical Analysis (DMA) according to ASTM 4065 using plate/plate geometry and 10 rad/s as angular frequency while imposing a temperature sweep of +2° C. per minute. The rubber tangent delta peak temperature (tanDmaxT) is the temperature at which the tangent delta peak corresponding to the glass to rubber transition is at its maximum value. The final cross-over temperature (Tcrossover) is the temperature corresponding to the transition from a more elastic behavior observed in the rubbery plateau zone to a more viscous behavior observed at high temperature. The Tcrossover is the temperature where the elastic modulus and the viscous modulus are equal, i.e., where tangent delta is 1.

Temperature sweep experiments are conducted from −40 to 300° C. with a heating ramp of +2° C./min and at 10 rad/s, where storage moduli (G'), loss moduli (G") and loss factors (tan δ) are obtained as a function of temperature. The rubber tangent delta peak temperature is considered herein to be the $T_g$ of the rubber phase.

The curing of the composition is achieved using a MDR. The sample is introduced in the machine mold preset at 110° C. (or at the copolymer highest $T_g$ if this is higher) to form a plate of 0.7 mm in thickness. The mold is closed under vacuum and maintain at that temperature for 2 minutes. The mold temperature is then increased to reach 180° C. The sample is kept at 180° C. for 30 minutes under vacuum to achieve curing. The MDR maximum torque value (expressed in dN·m) is recorded during the curing step at 180° C. and corresponds to the maximum torque recoded during that curing period. The time required to reach 90% of the maximum torque value is recorded as "tc90" and expressed in minutes and seconds.

Cured samples are analyzed for gel content and swelling ratio per PCGT.

Samples with 2 mm thickness are used for UL 94 tests.

Dielectric performance of the HSBC and the cured composition are measured at high frequency according to IPC-TM-650 2.5.5.9 Method at 1 GHz and/or according to IEC 61189-2-721-2015 Method at 10 GHz Permittivity and Loss tangent, parallel plate on samples at 23° C. and 50% humidity.

Tensile stress-strain properties are measured according to ASTM D412 using dumbell 'C' and a crosshead displacement speed of 500 mm/min.

Hardness shore A with 10 second dwell time is measured on a 3×2 mm plate according to ASTM D2240.

Unless otherwise specified, all reported melt flow rates (MFR) are measured according to ASTM D1238 under 2.16 kg load and at 230° C.

The components used in the examples include:

DCP: Dicumyl peroxide;

BIPB: Di(2-Tert-ButylPeroxylsopropyl)Benzene;

TAC: Triallyl cyanurate;

TAIC: Triallyl isocyanurate;

NORYL SA9000 resin is a modified low-molecular weight polyphenylene ether oligomers with vinyl end-groups available from SABIC;

NISSO-PB (B-3000): 1,2-polybutadiene homopolymer available from Nippon Soda,

POLYFLON MPA FA-5601 (flame retardant additive), available from DAIKIN,

FP-25005 (nitrogen-phosphorus based flame retardant) available from Adeka.

Samples were prepared by two methods: i) in the first method, the HSBC, or the thermoplastic elastomer composition produced therefrom, are pressed under high pressure at 180° C. into 2 mm plates; and ii) in the second method, a layer of the curable composition was obtained by preparing the curable composition in a solvent and pouring into a tray followed by vacuum drying at 60° C. for 4 hours. The sample can be further dried at higher temperature above the HSBC T$_g$ but without reaching conditions leading to premature curing.

Example 1—Preparation of Polymer 1: In a stainless steel reactor, 6 liter of purified and dried cyclohexane, 62 ml of sec-BuLi 0.45 M and 241.5 g of dried pMeS was added at 65° C. The reaction was allowed to proceed for 21 minutes and a sample was taken (1st). Then 68.7 g of 1,3-butadiene and 5.8 ml of 1,2-diethoxy propane was added and the reaction was allowed to proceed for 15 minutes. A small sample was taken (2nd) and 488.5 g of 1,3 butadiene and 197.4 g of pMeS were added in 88 and 11 minutes respectively and the reaction was allowed to proceed for 11 minutes. A small sample was taken (3rd) and 6.7 g of 1,3-butadiene was added. 1.6 ml of methyltrimethoxysilane (MTMS) was added in intervals of 2-12 minutes and the temperature was increased to 70° C. The reaction was allowed to proceed for 40 minutes after which the reaction was terminated with 0.8 ml 2-ethyl hexanol (4th).

The peak molecular weights (Mp) for the 1st, 2nd, 3rd and 4th samples are 8.9, 14.6, 57.5 and 118.4 kg/mol respectively, corresponding to each complete polymerization stage.

A sample was taken and the polymer solution was transferred to a hydrogenation reactor where the poly 1,3-butadiene blocks were hydrogenated with a homogeneous cobalt catalyst at 40 barg and 75° C. to a conversion level of 99 mol % in 5 hours. The solution was washed to remove the catalyst and stabilized with an anti-oxidant. The polymer was recovered from the solution by steam coagulation after which the product was milled and dried at 50-80° C.

Examples 2-5 (Polymer 2, Polymer 3, Polymer 4 and Polymer 5) were produced based on the procedure in Example 1, but using different quantities of ingredients. 600-900 kg of purified and dried cyclohexane was charged to the reactor along with 2-3 kg of a 10-15 wt % solution of sec-BuLi. 30-50 kg of dried pMeS was added to the reactor in a temperature range of 40-50° C. The reaction was allowed to proceed for 50-60 minutes and a sample was taken. Then, 10-30 kg of 1,3-butadiene and 900-1100 ml of 1,2-diethoxy propane was added and the reaction was allowed to proceed for 5-9 minutes. This was followed by addition of 75-125 kg of 1,3-butadiene in 60-120 minutes and 25-45 kg of pMeS in 12-18 minutes. The reaction was allowed to proceed for 12-18 minutes. A small sample was taken, and 1.2-3 kg of 1,3-butadiene was added. For Polymer 2, Polymer 3, and Polymer 4, this was followed by addition of 80-270 kg of MTMS at a temperature of 60-70° C. For Polymer 5, 200-250 kg of tetramethoxysilane (TMOS) was added at a temperature of 60-70° C. In each case, the reaction was allowed to proceed for 30-90 minutes, after which the reaction was terminated by addition of 8-11 ml of methanol. These polymers were hydrogenated using same procedure in Example 1. The RU level in the products obtained from the hydrogenation step are reported in Table 2.

Molecular weight data are shown in Table 2 and Table 3. Polymer 1, Polymer 3 and Polymer 4 exhibit a high level of hydrogenation in the polymerized diene units leading to RU levels of below 0.3 meq/g. This high level of hydrogenation leads to good resistance in applications under outdoor conditions, especially with respect to thermal oxidation and UV weathering resistance.

Example 6 is a linear poly(para-methylstyrene) with a Mp of 23 kg/mol. Example 7 is a hydrogenated block copolymer with poly(para-methylstyrene) rigid blocks at the extremities and a hydrogenated polybutadiene central rubbery block. Example 8 is a hydrogenated block copolymer with polystyrene rigid blocks at the extremities and a hydrogenated poly(butadiene-co-styrene) rubbery central block. Examples 6, 7, and 8 are all missing the 'block B'.

In Table 4, Examples 2-5 demonstrate that HSBCs have low viscosity both in the melt and in solution. Example 5 demonstrate a very low solution viscosity. Example 7, despite having a relatively low Mp, has a significantly higher viscosity both in the melt and in solution, making this polymer less satisfactory for various applications.

The mechanical properties of the polymers prepared are summarized in Table 5. Examples 3 and 4 show high tensile strength equal to or above 20 MPa and a DMA rubber transition temperature above −30° C. Example 7 shows a low DMA T$_g$ below −30° C. which is less desirable in applications such as copper clad laminates.

In Table 6, the homopolypropylene (PP) used has a melt flow rate (MFR) of 12 g/10 min under 2.16 kg load and at 230° C., according to ASTM D1238. Example 9 shows a desirable flame resistance of UL-94 V-0 rating. Example 10 as based on Polymer 8, which does not have a block B, exhibits a flame resistance of only a UL-94 V-2 rating with longer burning times t1 and t2.

Table 7 shows the curing agent used, the measured MDR characteristics during the curing as well as the solvent resistance of HSBCs after being cured, with gel % and swell ratio being computed by PCGT. All polymers were cured in presence of peroxide for 30 minutes at 180° C. in a MDR machine in the absence of air. Examples 13 to 15 demonstrate high curing efficiency with high gel content even at very low peroxide content such as 0.5 wt. % or 1 wt. %. Example 16 further demonstrates low swelling can be reached after curing with higher peroxide content. Examples 17, 19, and 20 did not cure properly and lead to very low gel content demonstrate a non-desirable weak solvent resistance after curing. Example 14 shows Dk of 2.31 and Df of 0.0006 measured at 10 GHz.

In Table 8, cured composition Examples 12 and 15 show excellent elastic modulus retention above 100° C. and up to 250° C. Example 20, however, shows a significant drop in elastic modulus above 150° C. The modulus reached at 200° C. is close to the modulus obtained on the non-cured corresponding HSBC Polymer 8. All examples demonstrate good thermal degradation behavior with a TGA 10% loss temperature of close to 400° C.

Table 9 shows examples of compositions that can be efficiently cured, as indicated by the significant maximum torque generated during the MDR curing. The use of co-curing agents allows to reduce the swelling of the cured sample in toluene, as indicated by the significant change in swell ratio for cured samples containing co-curing agents. The cured composition examples 23, 27, 29, and 30 showed very low swelling in solution. Data also shows that higher gel content can be enhanced with co-curing agents. Cured compositions of examples 22, 23, 28 and 29 show Dk of 2.39, 2.38, 2.32, and 2.4 respectively, and Df of 0.0007, 0.0013, 0.0008, and 0.0019 respectively, measured at 10 GHz.

The FIGURE displays the DMA of Polymer 4 and the composition example 15 made therefrom by curing with 1% DCP. Both examples show close performance at temperature below 100° C. The behavior of both samples is very different above 100° C. Above 100° C., Polymer 4 has an elastic modulus, G', decreasing strongly with temperature by more than 2 decades between 100° C. and 200° C. This indicates a quick loss of cohesion with the increased temperature. Above 100° C., Polymer 4 tangent delta is quickly increasing and reaches values above 1 at temperatures higher than 130° C. This indicates that Polymer 4 sample becomes more viscous than elastic above 130° C., turning into a viscous molten polymer. On the other hand, cured composition containing Polymer 4 (Example 15) shows an elastic modulus, G', stabilizing around 50-100 kPa up to 250° C. Above 100° C., cured composition maintains a tangent delta below 1, showing a preponderant elastic behavior.

Table 10 shows properties of HSBC (Polymer 4 and 5) and cured composition of HSBC (Example 14) obtained therefrom using 0.5% BIPB. The dielectric measurements were made at 1 GHz and at 10 GHz on samples at 23° C. and 50% humidity.

Dielectric properties of the cured composition based on Polymer 4 are presented in Table 11. The dielectric properties were measured at 10 GHz. Lower Dk and Df values were observed for example 34 containing cured composition having higher amount of Polymer 4.

quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Unless otherwise specified, the recitation of a genus of elements, materials or other components, from which an individual component or mixture of components can be

TABLE 2

HSBC structure and composition description.

| Example | Precursor Polymer | Rigid A block monomer(s) | Rigid A block Mp kg/mol | Mp of Linear or 2 arms[1] kg/mol | CE % | DOB # | RU meq/g |
|---|---|---|---|---|---|---|---|
| 1 | Polymer 1 | pMeS | 10 | 118 | 83 | 2.6 | 0.1 |
| 2 | Polymer 2 | pMeS | 6.9 | 160 | 83 | 2.2 | 0.33 |
| 3 | Polymer 3 | pMeS | 8.9 | 117 | 80 | 2.5 | 0.04 |
| 4 | Polymer 4 | pMeS | 10.3 | 128 | 85 | 2.2 | 0.09 |
| 5 | Polymer 5 | pMeS | 12 | 85 | 90 | 3.4 | 0.06 |
| 6[3] | Polymer 6 | pMeS | 23 | 23 | FS[2] | NA | NA |
| 7 | Polymer 7 | pMeS | 7.3 | 88 | FS[2] | NA | 0.09 |
| 8 | Polymer 8 | Styrene | 7.3 | 127 | 93 | 2.3 | 0.08 |

[1]2 times the Mp of 1 arm of the B block of the block copolymer.
[2]FS: Full Sequential block copolymer, so they are non-coupled polymers.
[3]Polymer 6 is not hydrogenated.
NA means not applicable.

As used herein, the term "comprising" means including elements or steps that are identified following that term, but any such elements or steps are not exhaustive, and embodiments can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

TABLE 3

Exemplary HSBC structure and composition description.

| Example | Structure[1] | Coupling agent | pMeS content Wt. % | Rubber block monomer(s) | Diene content Wt. % | 1,4 unit content in polydiene[2] Mol % | Corrected 1,4 diene unit content % | Aromatics Blockiness Index % |
|---|---|---|---|---|---|---|---|---|
| 1 | H2 (pMeS-Bd/pMeS)nX | MTMS | 45 | pMeS and Bd | 55 | 36 | 36 | 52 |
| 2 | H2 (pMeS-Bd/pMeS)nX | MTMS | 34 | pMeS and Bd | 66 | 29 | 29 | 50 |
| 3 | H2 (pMeS-Bd/pMeS)nX | MTMS | 44 | pMeS and Bd | 56 | 33 | 33 | 55 |
| 4 | H2 (pMeS-Bd/pMeS)nX | MTMS | 44 | pMeS and Bd | 57 | 31 | 31 | 53 |
| 5 | H2 (pMeS-Bd/pMeS)nX | TMOS | 62 | pMeS and Bd | 38 | 34 | 34 | 65 |
| 6 | (pMeS) | NA | 100 | None | 0 | NA | NA | >95 |
| 7 | H2 (pMeS-Bd-pMeS) | NA | 30 | Bd | 70 | 61 | 61 | >95 |
| 8 | H2 (St-Bd/St)nX | MTMS | 0 | St and Bd | 66 | 28 | 28 | 51 |

[1]Coupling agent.
[2]Before hydrogenation.
NA means not applicable.

TABLE 4

Viscosity properties of Exemplary HSBCs.

| Example | Polymer | Mp of Linear or 2 arms[1] kgPS/mol | Rubber block monomer(s) | MFR dg/mn | Solution viscosity cP |
|---|---|---|---|---|---|
| 1 | Polymer 1 | 118 | pMeS and Bd | 78 | n.m. |
| 2 | Polymer 2 | 160 | pMeS and Bd | 72 | 733 |
| 3 | Polymer 3 | 117 | pMeS and Bd | 72 | 454 |
| 4 | Polymer 4 | 128 | pMeS and Bd | 73 | 386 |
| 5 | Polymer 5 | 85 | pMeS and Bd | 88 | 135 |
| 6 | Polymer 6 | 23 | None | Not measured | 15 |
| 7 | Polymer 7 | 88 | Bd | 4 | 3725 |
| 8 | Polymer 8 | 127 | St and Bd | 48 | 532 |

[1] 2 times the 1 arm Mp for coupled block copolymers or Mp of the full sequential block copolymer.

TABLE 5

Mechanical properties of Exemplary HSBCs.

| Example | Polymer | Tensile Strength MPa | Tensile EaB % | Hardness Shore A | DMA tanDmax temperature (° C.) | DMA $T_{crossover}$ (° C.) |
|---|---|---|---|---|---|---|
| 2 | Polymer 2 | 15 | 1700 | 45 | −3 | n.m. |
| 3 | Polymer 3 | 25 | 960 | 75 | −10 | 115 |
| 4 | Polymer 4 | 20 | 680 | 70 | −14 | 139 |
| 7 | Polymer 7 | 45 | 780 | n.m. | −48 | 175 |
| 8 | Polymer 8 | 18 | 770 | 46 | −6 | 132 |

TABLE 6

Properties of flame retardant compositions containing the HSBCs.

| | | | Example 9 | Example 10 |
|---|---|---|---|---|
| Composition | Polymer 3 | Wt. % | 49.5 | 0 |
| | Polymer 8 | Wt. % | 0 | 49.5 |
| | PP having MFR 12 | Wt. % | 20 | 20 |
| | FA-5601 | Wt. % | 0.5 | 0.5 |
| | FP-2500S | Wt. % | 30 | 30 |
| Properties | UL-94 | | V-0 | V-2 |
| | t1 | (s) | 3 | 11 |
| | t2 | (s) | 10 | 41 |

TABLE 7

Curing characterization and properties of cured compositions in solvent.

| Example | Base polymer | Peroxide | Peroxide content Wt % | MDR max torqued dN*m | MDR tc90 minutes | cured gel % | swell ratio |
|---|---|---|---|---|---|---|---|
| 11 | Polymer 3 | BIPB | 0.5 | 0.94 | 7:34 | 65 | 24.8 |
| 12 | Polymer 3 | DCP | 1 | n.m. | n.m. | n.m. | n.m. |
| 13 | Polymer 2 | DCP | 1 | 3.37 | 3:13 | 88.3 | n.m. |
| 14 | Polymer 4 | BIPB | 0.5 | 3.1 | 6:20 | 83 | 19.6 |
| 15 | Polymer 4 | DCP | 1 | 3.0 | 3:32 | 92 | 13.5 |
| 16 | Polymer 4 | BIPB | 2 | 12.25 | 5:24 | 89.1 | 5.7 |
| 17 | Polymer 6 | BIPB | 0.5 | 1.5 | 8:54 | 0 | (a) |
| 18 | Polymer 7 | BIPB | 0.5 | 0.88 | 7:20 | 74 | 22.5 |
| 19 | Polymer 8 | BIPB | 0.5 | 0.06 | 8:58 | 1.2 | (a) |
| 20 | Polymer 8 | DCP | 1 | 0.31 | 2:24 | 1.2 | (a) |

(a): gel content was too low to measure.

TABLE 8

High temperature properties of cured HSBCs.

| Example | Base polymer | TGA 10% loss T ° C. | 150° C. G' kPa | 200° C. G' kPa | 250° C. G' kPa | Non cured 200° C. G' kPa |
|---|---|---|---|---|---|---|
| 12 | Polymer 3 | 410 | 69 | 63 | 48 | 0.2 |
| 14 | Polymer 4 | 401 | n.m. | n.m. | n.m. | n.m. |
| 15 | Polymer 4 | 398 | 57 | 40 | 25 | 0.9 |
| 20 | Polymer 8 | 409 | 15 | <3 | <3 | 1.4 |

TABLE 9

Curing characterization and solvent properties of cured compositions with co-curing agent.

| Example | Base polymer | Base polymer (parts) | Co-curing additive (parts) | Peroxide (wt. %) | MDR max torque dN*m | tc90 minutes | cured gel % | swell ratio | Dk (10 GHz) | Df (10 GHz) |
|---|---|---|---|---|---|---|---|---|---|---|
| 21 | Polymer 2 | 100 | None | BIPB (0.5) | 2.9 | 6:20 | 83 | 19.6 | | |
| 22 | Polymer 4 | 90 | TAIC (10) | BIPB (0.5) | 8.7 | 8:55 | 85 | 5.6 | 2.29 | 0.0007 |

TABLE 9-continued

Curing characterization and solvent properties of cured compositions with co-curing agent.

| Example | Base polymer | Co-curing additive (parts) | Peroxide (wt. %) | MDR max torque dN*m | tc90 minutes | cured gel % | swell ratio | Dk (10 GHz) | Df (10 GHz) |
|---|---|---|---|---|---|---|---|---|---|
| 23 | Polymer 4 70 | TAIC (30) | BIPB (0.5) | 18.7 | 8:43 | 87 | 2.7 | 2.38 | 0.0013 |
| 24 | Polymer 4 100 | none | DCP (1) | 3.1 | 3:32 | 92 | 13.5 | | |
| 25 | Polymer 4 90 | TAIC (10) | DCP (1) | 11.4 | 4:35 | 85 | 5 | | |
| 26 | Polymer 4 98 | TAIC (2) | DCP (1) | 7.7 | ~4 | n.m. | n.m. | | |
| 27 | Polymer 4 50 | SA-9000 (25) + B-3000 (25) | BIPB (1) | 18.9 | 5:45 | 100 | 1.9 | | |
| 28 | Polymer 5 100 | None | BIPB (0.5) | 0.6 | 8:51 | 85 | 26 | 2.32 | 0.0008 |
| 29 | Polymer 5 70 | TAIC (30) | BIPB (0.5) | 4.4 | 5:27 | 100 | 2.2 | 2.4 | 0.0019 |
| 30 | Polymer 5 70 | SA-9000 (20) + TAIC (10) | BIPB (0.5) | 3.1 | 8:16 | 94 | 3.6 | | |

TABLE 10

Dielectric performance of the HSBC and cured HSBC.

| | 1 GHz | | | 10 GHz | | |
|---|---|---|---|---|---|---|
| Polymer | Thickness (mm) | Dk | Df | Thickness (mm) | Dk | Df |
| 4 | 1.1 | 2.45 | 0.0002 | 0.808 | 2.30 | 0.0005 |
| 5 | — | — | — | 0.807 | 2.35 | 0.0005 |
| 14 | 1.1 | 2.46 | 0.0004 | — | — | — |

TABLE 11

Dielectric performance of the HSBC cured composition.

| | | Example 31 | Example 32 | Example 33 | Example 34 |
|---|---|---|---|---|---|
| Composition | Polymer 4 (Parts) | 10 | 30 | 50 | 70 |
| | SA9000 (Parts) | 90 | 70 | 50 | 30 |
| | BIPB (Parts) | 0.5 | 0.5 | 0.5 | 0.5 |
| Dielectric Properties (10 GHz) | Dk | 2.08 | 2.06 | 2.05 | 1.94 |
| | Df | 0.0033 | 0.0031 | 0.0025 | 0.0016 |

The invention claimed is:

1. A hydrogenated block copolymer comprising at least one polymer block A and at least one polymer block B, wherein prior to hydrogenation,
   each block A is a polymer of a first vinyl aromatic compound, and
   each block B is a copolymer block of monomer units:
   (a) a styrene compound having a radical reactive group,
   (b) at least one conjugated diene, and optionally
   (c) a second vinyl aromatic compound that is same or different from the first vinyl aromatic compound;
   wherein each block A has a peak molecular weight (Mp) of 3 to 60 kg/mol, and each block B has a peak molecular weight (Mp) of 20 to 200 kg/mol; and
   wherein the polymerized units derived from the monomer unit (a) constitutes from 10 to 70 wt. % of the total weight of the hydrogenated block copolymer, and from 10 to 80 wt. % of the total weight of the block B;
   wherein after hydrogenation,
   the polymerized units derived from the monomer (b) has a residual olefinic unsaturation of 0-1.5 meq per gram of the hydrogenated block copolymer; and
   wherein the hydrogenated block copolymer has:
   i) a DMA 10 rad/s tangent delta peak maximum temperature of −30 to 80° C.,
   ii) a gel content, after curing, as measured by a Peroxide Cured Gel Test (PCGT), of >40 wt. % of the total weight of the hydrogenated block copolymer; and
   iii) an aromatic blockiness index of 20 to 80%.

2. The hydrogenated block copolymer of claim 1, wherein the monomer unit (a) is para-methylstyrene, the monomer unit (b) is selected from the group consisting of isoprene, butadiene and combinations thereof;
   wherein the block B has a Corrected 1,4-diene unit content of 10 to 55%; and
   wherein the hydrogenated block copolymer has one or more of:
   i) a dielectric permittivity (Dk) at 1 GHz of <2.6,
   ii) a dielectric permittivity (Dk) at 10 GHz of <2.6,
   iii) a loss tangent (Df) at 1 GHz of <0.002,
   iv) a loss tangent (Df) at 10 GHz of <0.002, and
   v) a solution viscosity at 25 wt. % in toluene at 25° C. of <2000 cP.

3. The hydrogenated block copolymer of claim 2, wherein the weight percentage of (a) para-methylstyrene in the B block is between 10 and 50 wt. %.

4. The hydrogenated block copolymer of claim 1, wherein the block A comprises polymerized para-methylstyrene units.

5. The hydrogenated block copolymer of claim 2,
   wherein the block B has a Corrected 1,4-diene unit content of up to 50%;
   wherein the polymerized units derived from the monomer unit (b) has a residual olefinic unsaturation of 0-0.3 meq per gram of the hydrogenated block copolymer; and
   wherein the hydrogenated block copolymer has an aromatic blockiness index of 40% to 75%; and a solution viscosity at 25 wt. % in toluene at 25° C. of <1000 cP.

6. The hydrogenated block copolymer of claim 1, wherein the hydrogenated block copolymer has a DMA crossover temperature of 100-300° C.

7. The hydrogenated block copolymer of claim 1, wherein the hydrogenated block copolymer comprises one or more of structures A-B, A-B-A, (A-B-)$_n$, A-B-A-B, (B-A-B-)$_n$X, (B-A-)$_n$X, and (A-B-A-)$_n$X, wherein "X" is a coupling agent residue, and "n" is 1-30.

8. The hydrogenated block copolymer of claim 7, wherein the coupling agent is selected from the group consisting of methyltrimethoxysilane (MTMS), tetramethoxysilane (TMOS), divinylbenzene (DVB), dimethyladipate (DMA), and combinations thereof.

9. The hydrogenated block copolymer of claim 1, further comprising a functional group attached to the radical reactive group of the styrene compound of monomer unit (a).

10. A curable composition comprising: 1-99 wt. % of the hydrogenated block copolymer of claim 1, 0.1-5 wt. %, based on the total weight of the composition, of an initiator selected from a thermal initiator and an actinic initiator.

11. The curable composition of claim 10, wherein the thermal initiator is a peroxide.

12. The curable composition of claim 10, further comprising:
one or more co-curing agents selected from 1,2-bis(vinylphenyl)ethylene, butadiene based liquid rubber, divinyl aromatic compound, triallylcyanurate, triallyisocyanurate, vinyl functionalized polyphenylene oxide, bismaleimide aromatic resin, mono or multifunctional acrylate or methacrylate monomers, plasticizers, tackifying resin, styrenic block copolymers comprising one or more polydiene blocks, and combinations thereof;
a flame retardant; and
a solvent selected from the group consisting of aliphatic hydrocarbons, aromatic hydrocarbons, and combinations thereof.

13. The curable composition of claim 10, further comprising a polyolefin, wherein the curable composition is cured in the melt phase.

14. A blend comprising: 99-1 wt. % of the hydrogenated block copolymer of claim 1, and 1-99 wt. % of a crystalline polyolefin.

15. The blend of claim 14, further comprising a flame retardant.

16. The blend of claim 14, comprising 10-50 wt. % of the hydrogenated block copolymer, 1-20 wt. % of the crystalline polyolefin, and 20-50 wt. % of a flame retardant; wherein the blend has a rating of V0, according to UL94 vertical burn test method.

17. A cured composition obtained by curing the blend of claim 14.

18. An article comprising the cured composition of claim 17.

19. A curable composition containing: 100 parts of the hydrogenated block copolymer of claim 1 and 0.5 parts of a peroxide initiator, after curing at 180° C. for 2 hours and after compression molded, has a Dk at 1 GHz of <3.5, and a Df at 1 GHz of <0.003.

20. A curable composition containing 100 parts of the hydrogenated block copolymer of claim 1 and 0.5 parts of a peroxide initiator, after curing at 180° C. for 2 hours and after compression molded, has a Dk at 10 GHz of <2.6, and a Df at 10 GHz of <0.003.

* * * * *